United States Patent
Matsunaga

[11] Patent Number: 6,055,465
[45] Date of Patent: Apr. 25, 2000

[54] HAZARD DISPLAY SYSTEM

[75] Inventor: Mototatsu Matsunaga, Shizuoka-ken, Japan

[73] Assignee: Yazaki Corporation, Tokyo, Japan

[21] Appl. No.: 08/995,012

[22] Filed: Dec. 19, 1997

[30] Foreign Application Priority Data

Dec. 19, 1996 [JP] Japan .................................. 8-339767

[51] Int. Cl.$^7$ ................................................. B60Q 1/26
[52] U.S. Cl. .............................. 701/1; 340/471; 340/438; 307/10.8
[58] Field of Search ..................... 701/1, 36, 49; 307/10.1, 10.8; 340/426, 428, 438, 439, 468, 471, 472, 473, 478

[56] References Cited

U.S. PATENT DOCUMENTS

| | | | |
|---|---|---|---|
| 4,249,160 | 2/1981 | Chilvers | 340/471 |
| 4,827,245 | 5/1989 | Lipman | 340/473 |
| 4,878,042 | 10/1989 | Eggiman et al. | 340/439 |
| 5,663,709 | 9/1997 | Juang | 340/468 |

FOREIGN PATENT DOCUMENTS 5-37573  5/1993  Japan .

*Primary Examiner*—Gary Chin
*Attorney, Agent, or Firm*—Oblon, Spivak, McClelland, Maier & Neustadt, P.C.

[57] ABSTRACT

A flicker synchronizing signal generating section (23) generates a flicker synchronizing signal having a drive start-on time for front and rear hazard lamps (6a, 6b, 7a, 7b) set shorter than a drive start-off time in each period in accordance with a hazard signal and using the drive start-on time as a trigger period, a respective hazard output signal generating section (34, 44) generates a hazard output signal for having a drive of the hazard lamps start within the trigger period in accordance with the flicker synchronizing signal, with a drive-on time and a drive-off time set equal in each period thereof and with an interval from a start of the drive within each current trigger period to a start of the drive within the next trigger period set equal to the period of the flicker synchronizing signal, and a respective lamp driving section (33, 43) drives to flicker an associated hazard lamp in accordance with the hazard output signal.

8 Claims, 5 Drawing Sheets

HAZARD DISPLAY SYSTEM

BACKGROUND OF THE INVENTION

1. Field of the Invention

The present invention relates to a hazard display system in which a hazard display is driven with a signal sent from a vehicle end and flickers by a predetermined period.

2. Description of Relevant Art

The automotive vehicle has therein a plurality of control units, e.g. a main control unit associated with an instrument panel, an engine control unit associated with an engine installed in a front portion of the vehicle and connected to the main control unit, a trunk control unit associated with a rear trunk and connected to the main control unit, etc.

Such control units have their CPU's (central processing units) for processing input signals on current status of associated parts, elements or circumstances to output signals such as for control, drive, or display of information on the current status. The input signals may be data, commands, clocks, etc.

Typically, such the signals are supplied in the form of a multiplexed signal, such as a sequence of bit strings divided on a temporal axis, in a frequency field and/or by phase ranges. At a respective CPU, necessary bit strings are read from designated time slots, frequency bands or phase regions, and processed in a programmed order.

A conventional hazard display system includes: a hazard switch on an instrument panel; a pair of emergency flicker display lamps (hereafter "hazard lamp") to be placed or set on a road either in front of and behind the vehicle, as it is stopped on the road due to an accident or trouble; and a drive system for the front and rear hazard lamps that comprises a main control unit associated with the hazard switch, an engine control unit controlled from the main control unit for temporarily driving the front hazard lamp, and a trunk control unit controlled from the main control unit for temporarily driving the rear hazard lamp.

The drive control from the main control unit is effected by a combination of a hazard signal and a flicker synchronizing signal to be read from a multiplexed signal at each controlled control unit. The hazard signal inherently is responsible to have each hazard lamp illuminate with a luminosity. The flicker synchronizing signal is for having the hazard lamps synchronously flicker. They had played their rolls in dedicated or passive switching circuitry.

Neither the engine control unit nor the trunk control unit is dedicated for driving the hazard lamp. They have their routine tasks to be executed in different great numbers of steps at bit processing rates. The hazard signal may de defined by a starting rise and an ending fall. However, the flicker synchronizing signal has to interrupt a process of routine task, at one of programmed points therefor.

FIG. 1 shows a combination of time charts of concerned signals in the conventional hazard display system.

At first, a hazard switch is turned on by a manual operation, which is detected, and a detection signal is input to the main control unit, where it is processed to generate a hazard signal in combination with a flicker synchronizing signal, which signals are output from the main control unit in a multiplexing manner and transmitted via multiplex signal lines to the engine control unit in a front portion of a vehicle and the trunk control unit in a rear portion of the vehicle.

The flicker synchronizing signal has a predetermined period Ta of e.g. 700 ms, and keeps an on-state over half the period, where it is e.g. a 1, and an off-state over the remaining half, where it is e.g. a 0. The synchronizing signal comprises a sequence of occurrences of the on-state followed by the off-state, which combination is an occurrence unit and will sometimes be called "flicker synchronous signal" or simply "synchronous-signal".

A first synchronous signal is input to the engine control unit, where its 1's and 0's are sequentially held until they will be sequentially processed in a program having interrupted a current task program. The interrupting program generates a sequence of signal values corresponding to the 1's and another sequence of signal values corresponding to the 0's. A combination of the generated signal value sequences provides a first one of an occurrence unit of a lamp driving signal to be output to the front hazard lamp, which signal unit will sometimes be called "front drive signal" or simply "drive signal".

The first synchronous signal is followed by a second synchronous signal. They are alike. There is thus generated an analogous second front drive signal at a timing depending on e.g. an interruption associated therewith, which is not always the same as that of the first drive signal. The occurrence of the second drive signal defines an end of the first drive signal, which thus has a corresponding period T11. Likewise, the second drive signal will have another period T12 defined by a third front drive signal.

On the other hand, the first synchronous signal is input to the trunk control unit also, where its 1's and 0's are sequentially processed in another program flow having interrupted another current task program. Accordingly, there occurs a first rear drive signal having still another period T13, which drive signal will be followed by a second rear drive signal having yet another period T14.

The period Ta of flicker synchronous signal is short. A synchronous signal may have been fast processed at the engine control unit, when processed at the trunk control unit with a significant delay, as any effective signal value can be processed to generate an effective drive signal.

A pair of resultant front and rear flickers might have been for a stopped vehicle on a road and might resemble a tail lamp or head light of a distant running vehicle, when observed from a vehicle traveling the road in the night.

SUMMARY OF THE INVENTION

The present invention has been achieved with such points in view.

It therefore is an object of the present invention to provide a hazard display system in which a display element such as a hazard lamp is drivable to display a hazard with a relatively stable flicker period, e.g. substantially free from a timing difference of an interrupt action.

It also is an object of the present invention to provide a hazard display system in which a pair of display elements such as a pair of front and rear hazard lamps are synchronously drivable to flicker for displaying a hazard, substantially in free from a difference of bit processing rate.

To achieve the object, a first aspect of the invention provides a hazard display system (FIGS. 2–5) comprising: a first display element (6a,6b) drivable with a first drive signal to provide a first flicker for displaying a hazard; a first processor (3) controllable with a multiplexed signal normally for processing a first set of data (from 38) to control a first load (39, e.g. engine), the first processor (3) being resettable with a synchronous signal to be processed to start generating a sequence of the first drive signals occurring with a first period (T2+T2); circuitry (2) for generating the multiplexed signal; and a hazard switch element (8) operable for driving the circuitry (2) to have the multiplexed signal contain a sequence of the synchronous signals occurring with a period (Ta; Tb) longer than the first period (T2+T2).

According to the first aspect: an electric circuit for generating a multiplexed signal is driven with a hazard switch element so that the multiplexed signal contains a sequence of synchronous signals with periods of a certain length of time; a first processor, which is controllable with the multiplexed signal normally for processing a certain first set of data to control a first electric load irrelevant to the hazard display, receives the synchronous signal sequence and is reset by each current interrupting synchronous signal therein so that it may continue a normal service but it is responsible for the current synchronous signal to be processed, whereby a program flow in the processor may go or returns to an entry of a signal generation routine, as this synchronous signal is at a first turn or a subsequent turn in the signal sequence, and it starts or restarts generating a sequence of first drive signals with periods of an even time length called first period that is shorter than the above-mentioned certain length of time and may appear therein a number of times until a final occurrence is interrupted by a subsequent synchronous signal; and a first display element that may be a hazard lamp is driven by each first drive signal to provide a first flicker, i.e., a certain first pattern of flickering actions displaying or indicating a presence of a hazard that may be a stopped vehicle on a road.

Accordingly, a display element such as a hazard lamp is drivable to display a hazard with a relatively stable flicker period.

According to a second aspect (FIG. 2) of the invention, the hazard display system further comprises: a second display element (7a, 7b) drivable with a second drive signal to provide a second flicker for displaying the hazard; and a second processor (4) controllable with the multiplexed signal normally for processing a second set of data (from 49) to control a second load (48, e.g. rear trunk), the second processor (4) being resettable with the synchronous signal to be processed to start generating a sequence of the second drive signals occurring with a second period (T2+T2; T3+T3; T4+T4) shorter than the period (Ta; Tb) of the synchronous signals.

According to the second aspect, a pair of display elements such as a pair of front and rear hazard lamps are concurrently drivable to display a hazard with a first and a second flicker stable in period.

According to a third aspect (FIG. 3) of the invention, the hazard display system further comprises: means (25, 35, 36, 45, 46) for comparing an occurrence of the first drive signal of a turn in the sequence of the first drive signals with an occurrence of the second drive signal of the turn in the sequence of the second drive signals to check for a phase difference therebetween exceeding a threshold (e.g. T2/2 or T2-vicinity); and means (37, 47) for responding to the phase difference to have (at least) one of the first and second processors stop generating one of the sequence of the first drive signals and the sequence of the second drive signals.

According to the third aspect, a pair of first and second display elements are substantially synchronously controllable to provide a defined flicker.

According to a fourth aspect (FIG. 5) of the invention, the first period (T2+T2) equals the second period (T2+T2).

According to the fourth aspect, a pair of first and second display elements are controllable to provide a more defined flicker.

According to a fifth aspect (FIG. 4) of the invention, the first period (T2+T2) depends on a data processing rate of the first processor (3).

According to the fifth aspect, a first processor is operable with a minimized waiting for a reset.

According to a sixth aspect (FIGS. 3–5) of the invention, the synchronous signal comprises a trigger pulse (with period T1) for triggering generating the sequence of the first drive signals.

According to the sixth aspect, a sequence of first drive signals has an increased flexibility in design of signal period as well as signal number.

Further, to achieve the object described, a seventh aspect of the invention provides a hazard display system (FIGS. 2–5) for driving a hazard lamp to flicker in accordance with a hazard signal sent from a vehicle end through a multiplexed signal line, the hazard display system comprising: a flicker synchronizing signal generating section (23) for generating a flicker synchronizing signal having a drive start-on time (T1) for a hazard lamp (6a, 6b, 7a, 7b) set shorter than a drive start-off time (Ta-T1; Tb-T1) for the hazard lamp in each period (Ta; Tb) thereof in accordance with the hazard signal and using the drive start-on time (T1) as a trigger period; a hazard output signal generating section (34, 44) for generating a hazard output signal for having a drive of the hazard lamp start within the trigger period (T1) in accordance with the flicker synchronizing signal, with a drive-on time (T2) and a drive-off time (T2) set equal in each period (T2+T2) thereof and with an interval (Ta; Tb) from a start (t3, t4) of the drive within each trigger period (T1) to a start (t8, t9; t13, t14) of the drive within the next trigger period (T1) set equal to the period (Ta; Tb) of the flicker synchronizing signal; and a lamp driving section (33, 43) for driving the hazard lamp to flicker in accordance with the hazard output signal generated by the hazard output signal generating section (34, 44).

According to the seventh aspect, the flicker synchronizing signal generating section generates a flicker synchronizing signal having a drive start-on time for a hazard lamp set shorter than a drive start-off time for the hazard lamp in each period thereof in accordance with the hazard signal and using the drive start-on time as a trigger period, and the hazard output signal generating section generates a hazard output signal for having the drive of the hazard lamp start within the trigger period in accordance with the flicker synchronizing signal, with a drivel-on time and a drive-off time set equal in each period thereof and with an interval from a start of the drive within each trigger period to a star of the drive within the next trigger period set equal to the period of the flicker synchronizing signal. Therefore, the lamp driving section can drive to flicker the hazard lamp in a predetermined period in accordance with the hazard output signal.

According to an eighth aspect of the invention, the hazard lamp is provided as a front hazard lamp (6a, 6b) in a front of a vehicle and a rear hazard lamp in a rear of the vehicle; the hazard output signal generating section includes a front hazard output signal generating section (34) for generating a front hazard output signal and a rear hazard output signal generating section (44) for generating a rear hazard output signal having a drive-on start time (t3) different from a drive-on start time (t4) of the front hazard output signal; and the lamp driving section includes a first driving section (33) for driving to flicker the front hazard lamp (6a, 6b) in accordance with the front hazard output signal and a second driving section (43) for driving to flicker the rear hazard lamp (7a, 7b) in accordance with the rear hazard output signal.

According to the eighth aspect, the front hazard lamp is drivable for a flicker in accordance with a front hazard output signal, and the rear hazard lamp also, for a flicker in accordance with a rear hazard output signal.

According to a ninth aspect of the invention, the hazard display system further comprises: a front and rear hazard signal decision-making section (36, 46) for making a decision as to whether a phase difference between a concerned front hazard output signal and a concerned rear hazard output signal has exceeded a predetermined time interval after the front hazard lamp (6a, 6b) and the rear hazard lamp (7a, 7b) have repeated flickering a predetermined number of times in accordance with the numbers of front hazard output signals and rear hazard output signals, respectively; and a timing control section (37, 47) responsible for the phase difference exceeding the predetermined time interval to set the concerned front hazard output signal and the concerned rear hazard output signal to drive-off status thereof until the front and rear hazard output signals enter drive-on status thereof within a subsequent trigger period of the flicker synchronizing signal, respectively.

According to the ninth aspect, the front and rear hazard signal decision-making section makes a decision as to whether a phase difference between a front hazard output signal and a rear hazard output signal has exceeded a predetermined time interval, and if the difference has exceeded the predetermined interval, the timing control section sets the front and rear hazard output signals to their drive-off status, which remain till the front and rear hazard output signals enter their drive-on status in a subsequent trigger period of the flicker synchronizing signal. Accordingly, it is possible to rectify a phase slip between the front hazard output signal and the rear hazard output signal.

According to a tenth aspect of the invention, the hazard output signal generating section (34, 44) is cooperative with a central processing unit (32, 42), and at least one of the drive start-on time (T1) and the drive start-off time (Ta-T1, Tb-T1) of the flicker synchronizing signal is determined in dependence on a signal processing speed of the central processing unit (32, 42).

According to the tenth aspect, the hazard output signal generating section that may be a software program is cooperative with a central processing unit that may be a microcomputer, and at least either the drive start-on time or the drive start-off time of the flicker synchronizing signal is set in accordance with a signal processing speed of the central processing unit, permitting a flicker-less waiting time to be minimized before a subsequent synchronous flicker starts.

BRIEF DESCRIPTION OF THE
ACCOMPANYING DRAWINGS

The above and further objects and novel features of the present invention will more fully appear from the following detailed description when the same is read in conjunction with the accompanying drawings, in which.

Figure 1:
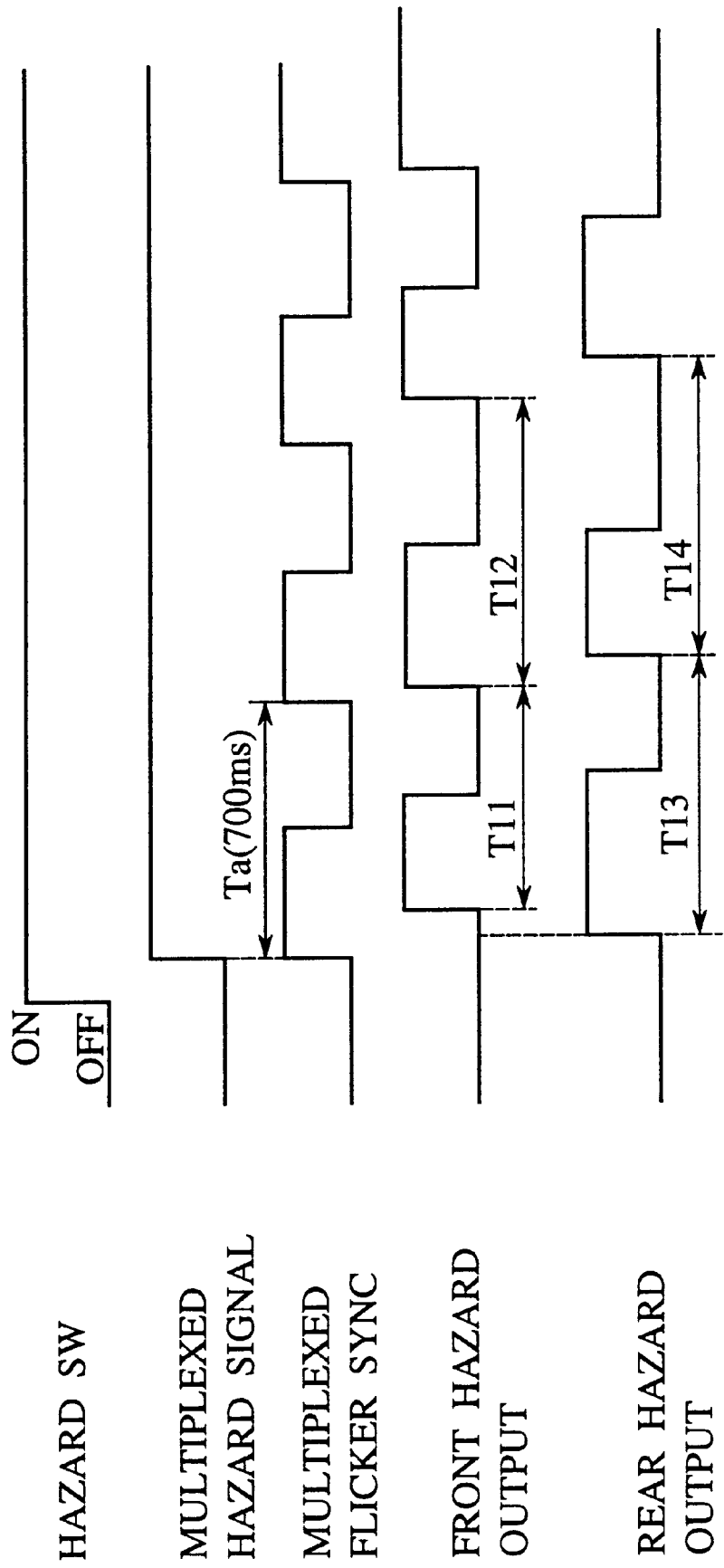
FIG. 1 is a combination of timing charts of signals in a conventional hazard display system.

DETAILED DESCRIPTION OF THE
PREFERRED EMBODIMENTS

There will be detailed below the preferred embodiments of the present invention with reference to the accompanying drawings. Like members are designated by like reference characters.

Figure 2:
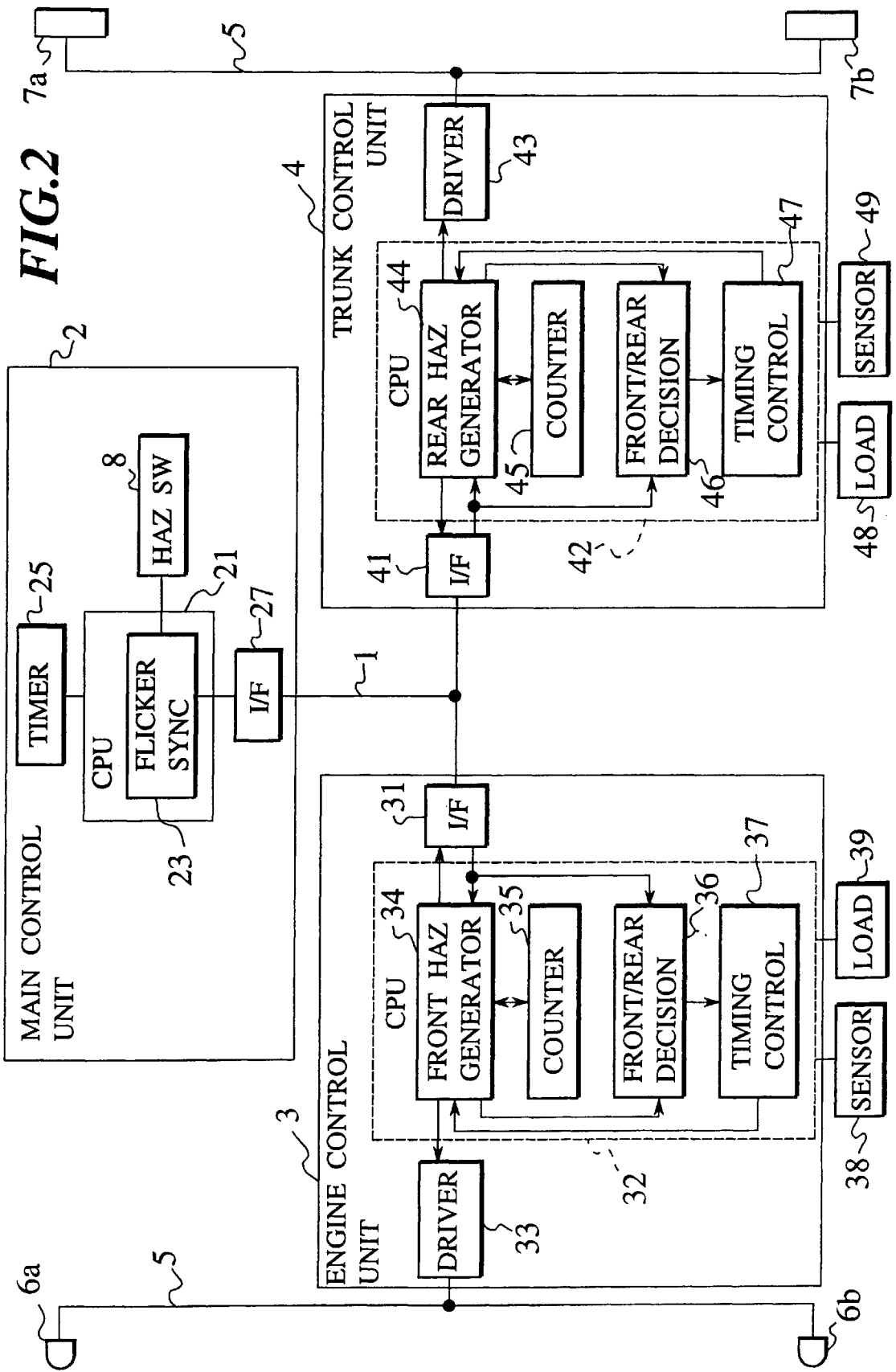
FIG. 2 is a block diagram of a hazard display system according to a first to a third embodiments of the invention.
Figure 3:
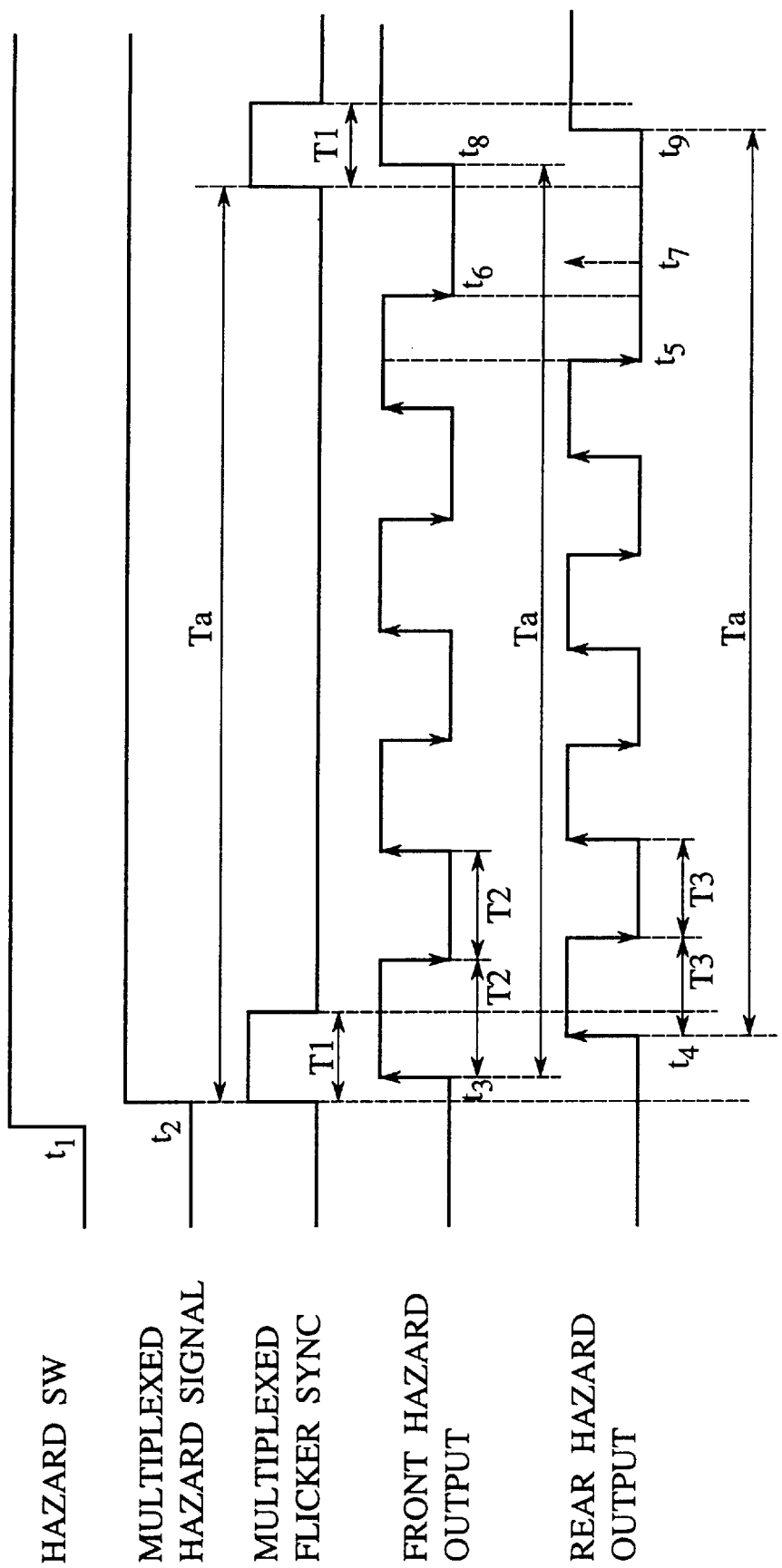
FIG. 3 is a combination of timing charts of signals in the hazard display system of FIG. 2, as it is addressed to the first embodiment.

FIG. 2 shows a structural block diagram of a mode of implementation of the hazard display system.

In the hazard display system shown in FIG. 2, a main control unit 2, an engine control unit 3 and a trunk control unit 4 are connected to a multiplexed signal line 1, and a multiplexed signal is being transferred between the units through the multiplexed signal line 1.

A signal line 5 is connected to the output side of the engine control unit 3 and the trunk control unit 4. To this signal line 5 are connected front hazard lamps 6a and 6b and rear hazard lamps 7a and 7b.

A hazard switch 8 is connected to the main control unit 2. The hazard switch 8 is turned on at the time of emergency flickering the front hazard lamps 6a and 6b and rear hazard lamps 7a and 7b.

The main control unit 2 has a central processing unit (CPU) 21 for processing signals input from various switches, a flicker synchronizing signal generating section 23, a timer 25 and an interface (I/F) 27.

The timer 25 manages time within a vehicle. The flicker synchronizing signal generating section 23 generates a multiplexed flicker synchronizing signal in accordance with a multiplexed hazard signal when the hazard switch 8 has been turned on. The multiplexed flicker synchronizing signal is a signal for applying a trigger, with a lamp-on time T1 shorter than the period Ta (for example, 700 ms), and having the lamp-on time T1 as the trigger period.

The CPU 21 transfers the multiplexed hazard signal and the multiplexed flicker synchronizing signal from the flicker synchronizing signal generating section 23 to the through the I/F 27.

The engine control unit 3 is for controlling each load within the engine room, and includes an I/F 31 and a CPU 32. The CPU 32 includes a front hazard output signal generating section 34, a counter 35, a front and rear hazard signal decision-making section 36 and a timing control section 37.

The CPU 32 is connected with a sensor 38 and a load 39, so that the CPU 32 drives the load 39 in accordance with a sensor signal from the sensor 38.

The front hazard output signal generating section 34 generates a front hazard output signal in accordance with a multiplexed hazard signal and a multiplexed flicker synchronizing signal transferred from the multiplexed signal line 1, and outputs this front hazard output signal to a lamp driving section 33.

The front hazard output signal becomes on during an on period T1 of the multiplexed flicker synchronizing signal and repeats on and off by a predetermined number of times in a period corresponding to the processing speed of the CPU 32 (a half period is T2 and one period is 2T2), and becomes on during an on period T1 in the next period of the multiplexed flicker synchronizing signal.

The time wherefrom the front hazard output signal becomes on until the front hazard output signal in the next period of the multiplexed flicker synchronizing signal becomes on is the same as the period Ta of the multiplexed flicker synchronizing signal.

The counter 35 counts the time wherefrom the front hazard output signal becomes on until the front hazard output signal in the next period of the multiplexed flicker synchronizing signal becomes on, that is, the period Ta of the multiplexed flicker synchronizing signal, and resets the count value at the time when the front hazard output signal in the next period of the multiplexed flicker synchronizing signal becomes on.

The front and rear hazard signal decision-making section 36 makes a decision as to whether there is a large time difference between the front hazard output signal generated in the front hazard output signal generating section 34 and a rear hazard output signal generating section generated in a rear hazard output signal generating section 46 to be described later.

The front and rear hazard signal decision-making section 36 makes a decision as to whether, for example, one of the front and rear hazard output signals is on and the other signal is off and whether this off period has exceeded a half of the on period.

When the off period has exceeded a half of the on period, the timing control section 37 keeps the front and rear hazard output signals off (kept waited) until when the hazard output signal in the next period of the multiplexed flicker synchronizing signal has become on. The lamp driving section 33 drives the front hazard lamps 6a and 6b in accordance with the input front hazard output signal and flickers the front hazard lamps 6a and 6b.

The trunk control unit 4 is for controlling each load within the trunk room, and includes an I/F 41, a CPU 42 and the lamp driving section 43. The CPU 42 includes a rear hazard output signal generating section 44, a counter 45, a front and rear hazard signal decision-making section 46 and a timing control section 47.

The CPU 42 is connected with a sensor 48 and a load 49, so that the CPU 42 drives the load 49 in accordance with a sensor signal from the sensor 48.

The rear hazard output signal generating section 44 generates a rear hazard output signal in accordance with a multiplexed hazard signal and a multiplexed flicker synchronizing signal transferred from the multiplexed signal line 1, and outputs this rear hazard output signal to a lamp driving section 43.

The rear hazard output signal becomes on during an on period T1 of the multiplexed flicker synchronizing signal and repeats on and off by a predetermined number of times during a period corresponding to the processing speed of the CPU 42 (a half period is T3 and one period is 2T3), and becomes on during an on period T1 in the next period of the multiplexed flicker synchronizing signal.

The time wherefrom the rear hazard output signal becomes on until the rear hazard output signal in the next period of the multiplexed flicker synchronizing signal becomes on is the same as the period Ta of the multiplexed flicker synchronizing signal.

The counter 45 counts the time wherefrom the rear hazard output signal becomes on until the rear hazard output signal in the next period of the multiplexed flicker synchronizing signal becomes on, that is, the period Ta of the multiplexed flicker synchronizing signal, and resets the count value at the time when the rear hazard output signal in the next period of the multiplexed flicker synchronizing signal becomes on.

The front and rear hazard signal decision-making section 46 has almost the same structure as that of the front and rear hazard signal decision-making section 36, and the timing control section 47 has almost the same structure as that of the timing control section 37.

Next, the operation of the first embodiment of a hazard display system according to the present mode of implementation having the above-described structure will be explained with reference to a timing flowchart. A case where the period of the multiplexed flicker synchronizing signal is Ta and the period of the rear hazard output signal is shorter than the transfer period of the front hazard output signal will be explained.

At first, when the hazard switch 8 is turned on at time t1, the CPU 21 in the main control unit 2 outputs a multiplexed hazard signal and a multiplexed flicker synchronizing signal to the multiplexed signal line 1 at time t2.

Then, in the engine control unit 3, the front hazard output signal generating section 34 generates a front hazard output signal in accordance with the multiplexed hazard signal and the multiplexed flicker synchronizing signal. The generated front hazard output signal becomes on at time t3 during the on period T1 of the multiplexed flicker synchronizing signal, and repeats on and off by a predetermined number of times in the period corresponding to the processing speed of the CPU 32 (a half period is T2 and one period is 2T2).

Since the lamp driving section 33 drives the front hazard lamps 6a and 6b in accordance with the front hazard output signals of which half period T2 is mutually the same, it is possible to display the front hazard lamps 6a and 6b always in a constant flickering period.

In this case, the counter 35 starts counting the time at time t3 when the front hazard output signal becomes on and finishes the counting at time T8 when the front hazard output signal in the next period of the multiplexed flicker synchronizing signal becomes on, that is, the period Ta of the multiplexed flicker synchronizing signal (for example, 700 ms).

On the other hand, in the trunk control unit 4, the rear hazard output signal generating section 44 generates a rear hazard output signal in accordance with the multiplexed hazard signal and the multiplexed flicker synchronizing signal. The generated rear hazard output signal becomes on at time t4 during the on period T1 of the multiplexed flicker synchronizing signal, and repeats on and off by a predetermined number of times in the period corresponding to the processing speed of the CPU 42 (a half period is T3 and one period is 2T3).

Since the lamp driving section 43 drives the rear hazard lamps 7a and 7b in accordance with the rear hazard output signals of which half periods T3 are mutually the same as described above, it is possible to display the rear hazard lamps 7a and 7b always in a constant flickering period.

Further, the counter 45 starts counting the time at time t4 when the rear hazard output signal becomes on and finishes the counting at time T9 when the rear hazard output signal in the next period of the multiplexed flicker synchronizing signal becomes on, that is, the period Ta of the multiplexed flicker synchronizing signal.

The front and rear hazard signal decision-making section 36 makes a decision as to whether the front hazard output signal is on and the rear hazard output signal is off and whether this off period has exceeded a half of the on period, after the front hazard output signal and the rear hazard output signal have repeated on and off by a predetermined number of times.

In this case, since the off period exceeds a half of the on period at time t6, the timing control section 37 makes the front hazard output signal to be off (kept waited) from time t6 to time T8 when the hazard output signal becomes on, and makes the rear hazard output signal to be off (kept waited) from time t5 to time T9 when the hazard output signal becomes on.

By the above-described operation, it is possible to adjust the timing deviation between the front hazard output signal and the rear hazard output signal.

Then, the counter 35 resets the count value (period Ta) at time t8 when the front hazard output signal in the next period of the multiplexed flicker synchronizing signal becomes on, and starts the next count. Further, the counter 45 resets the count value (period Ta) at time t9 when the front hazard output signal in the next period of the multiplexed flicker synchronizing signal becomes on, and starts the next count.

Figure 4:
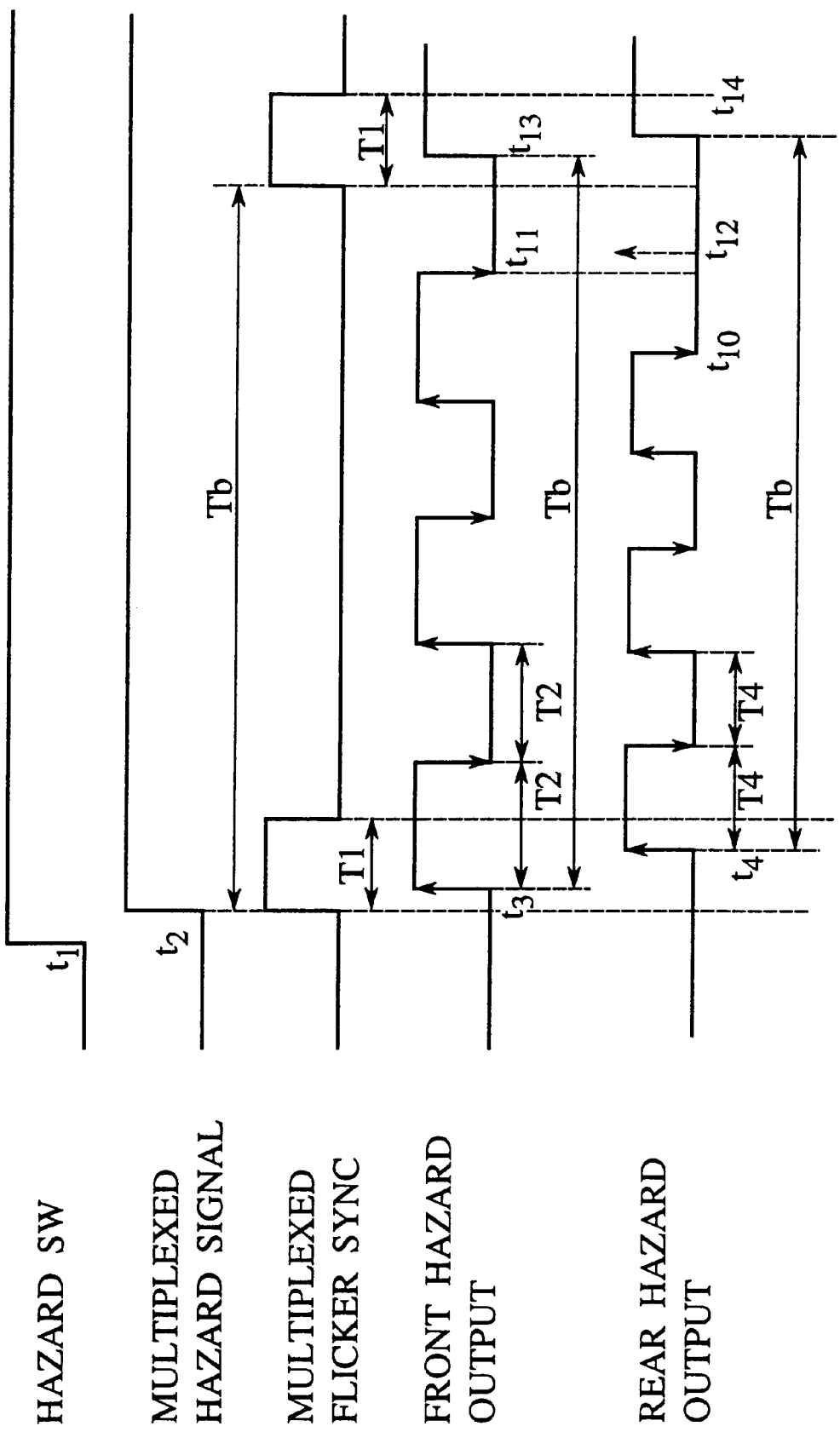
FIG. 4 is a combination of timing charts of signals in the hazard display system of FIG. 2, as it is addressed to the second embodiment.

Next, the second embodiment of the hazard display system will be explained with reference to a timing flowchart shown in FIG. 4. In this case, a case where the period of the multiplexed flicker synchronizing signal is Tb and the period of the rear hazard output signal is further shorter than the transfer period of the front hazard output signal will be explained.

In this case, the periods Tb of the front and rear hazard output signals are shorter than the period Ta, and the on period T1 and the on and off repetition period, that is, the period Tb, of the multiplexed flicker synchronizing signal are set freely according to the processing speed of the CPUs 32 and 42.

At first, the front hazard output signal generated in the front hazard output signal generating section 34 becomes on at time t3 during the on period T1 of the multiplexed flicker synchronizing signal, and repeats on and off by a predetermined number of times in the period corresponding to the processing speed of the CPU 32 (a half period is T2 and one period is 2T2).

Since the lamp driving section 33 drives the front hazard lamps 6a and 6b in accordance with the front hazard output signals of which half periods T2 are mutually the same as described above, it is possible to display the front hazard lamps 6a and 6b always in a constant flickering period.

In this case, the counter 35 starts counting the time at time t3 when the front hazard output signal becomes on and finishes the counting at time T13 when the front hazard output signal in the next period of the multiplexed flicker synchronizing signal becomes on, that is, the period Tb (for example, 500 ms) of the multiplexed flicker synchronizing signal.

On the other hand, the rear hazard output signal generated in the rear hazard output signal generating section 44 becomes on at time t4 during the on period T1 of the multiplexed flicker synchronizing signal, and repeats on and off by a predetermined number of times in the period corresponding to the processing speed of the CPU 42 (a half period is T4 and one period is 2T4).

Since the lamp driving section 43 drives the rear hazard lamps 7a and 7b in accordance with the rear hazard output signals of which half periods T4 are mutually the same as described above, it is possible to display the rear hazard lamps 7a and 7b always in a constant flickering period.

Further, the counter 45 starts counting the time at time t4 when the rear hazard output signal becomes on and finishes the counting at time T14 when the rear hazard output signal in the next period of the multiplexed flicker synchronizing signal becomes on, that is, the period Tb of the multiplexed flicker synchronizing signal.

The front and rear hazard signal decision-making section 36 makes a decision as to whether the front hazard output signal is on and the rear hazard output signal is off and whether this off period has exceeded a half of the on period, after the front hazard output signal and the rear hazard output signal have repeated on and off by a predetermined number of times.

In this case, since the off period exceeds a half of the on period at time t11, the timing control section 37 makes the front hazard output signal to be off (kept waited) from time t11 to time T13 when the hazard output signal becomes on, and makes the rear hazard output signal to be off (kept waited) from time t10 to time T14 when the hazard output signal becomes on.

Then, the counter 35 resets the count value (period Tb) at time t13 when the front hazard output signal in the next period of the multiplexed flicker synchronizing signal becomes on, and starts the next count. Further, the counter 45 resets the count value (period Tb) at time t14 when the front hazard output signal in the next period of the multiplexed flicker synchronizing signal becomes on, and starts the next count.

As described above, since the periods Tb of the front and rear hazard output signals are set shorter than the period Ta, and also since the on period T1 and the on and off repetition period, that is, the period Tb, of the multiplexed flicker synchronizing signal are set freely according to the processing speed of the CPUs 32 and 42, it is possible to display always in a constant flickering period with minimum wasteful waiting time.

Figure 5:
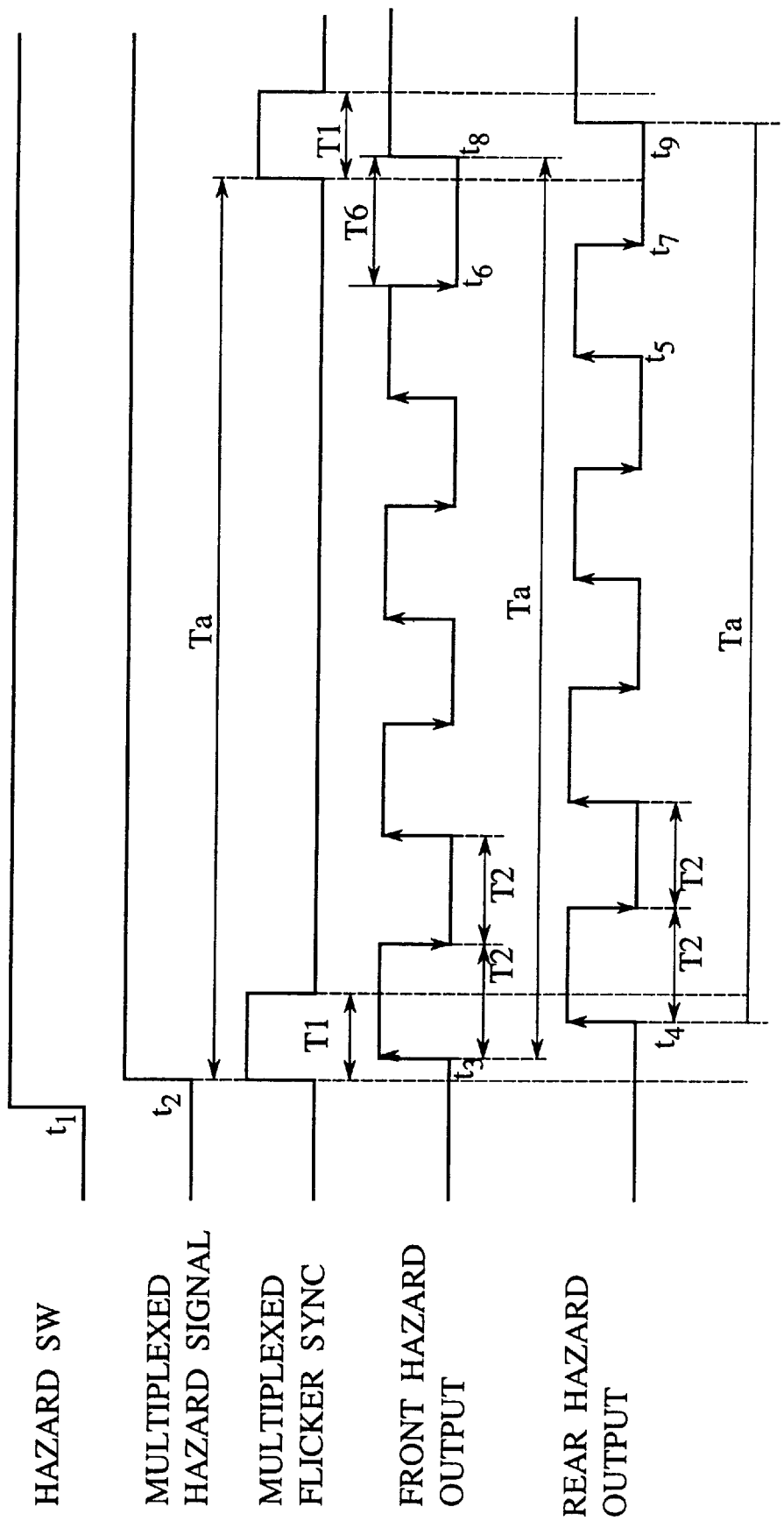
FIG. 5 is a combination of timing charts of signals in the hazard display system of FIG. 2, as it is addressed to the third embodiment.

Next, the third embodiment of the hazard display system will be explained with reference to a timing flowchart shown in FIG. 5. Description will be made of the case where the period of the multiplexed flicker synchronizing signal is Ta and the transfer period of the front hazard output signal and the period of the rear hazard output signal are equal.

At first, the front hazard output signal generated in the front hazard output signal generating section 34 becomes on at time t3 during the on period T1 of the multiplexed flicker synchronizing signal, and repeats on and off by a predetermined number of times in the period corresponding to the processing speed of the CPU 32 (a half period is T2 and one period is 2T2). Then, when the time period T6 from time t6 to time t8 is close to a half period T2, the period from time t6 to time t8 is set off.

On the other hand, the rear hazard output signal generated in the rear hazard output signal generating section 44 becomes on at time t4 during the on period T1 of the multiplexed flicker synchronizing signal, and repeats on and off by a predetermined number of times in the period corresponding to the processing speed of the CPU 42 (a half period is T2 and one period is 2T2). Then, when the time period T6 from time t7 to time t9 is close to a half period T2, the period from time t7 to time t9 is set off.

As explained above, it is possible to display the front hazard lamps 6a and 6b and the rear hazard lamps 7a and 7b always in a constant flickering period in accordance with the front hazard output signals and the rear hazard output signals of which half periods T2 are mutually the same.

As will be seen from the foregoing description, the first to the third embodiment disclose various aspects of the invention as well as the first to the tenth.

While preferred embodiments of the present invention have been described using specific terms, such description is for illustrative purposes, and it is to be understood that changes and variations may be made without departing from the spirit or scope of the following claims.

What is claimed is:

1. A hazard display system, comprising:

a control unit configured to generate a multiplex control signal;

a hazard switch element configured, in response to being switched on, to signal to said control unit to include a flicker synchronizing signal in said multiplex control signal, wherein the period of said flicker synchronizing signal includes an ON state and an OFF state;

a first processor configured to process a first set of data to control a first load during normal operation in response to said multiplex control signal and to generate a first drive signal in response to being interrupted by said flicker synchronizing signal when said flicker synchronizing signal changes to said ON state;

a second processor configured to process a second set of data to control a second load during normal operation in response to said multiplex control signal and to generate a second drive signal in response to being interrupted by said flicker synchronizing signal when said flicker synchronizing signal changes to said ON state;

a first display element drivable by said first drive signal and configured to display a front flickering hazard signal, wherein the period of said front flickering hazard signal has an ON state and an OFF state; and a second display element drivable by said second drive signal and configured to display a rear flickering hazard output signal, wherein the period of said rear flickering hazard output signal has an ON state and an OFF state, wherein said front flickering hazard signal and said rear flickering hazard signal are in said ON state at least twice during one period of said flicker synchronizing signal in order to reduce the number of times said first processor and said second processor are interrupted by said flicker synchronizing signal.

2. A hazard display system according to claim 1, further comprising:

a main control unit configured to compare an occurrence of the first drive signal with an occurrence of the second drive signal to check for a phase difference therebetween exceeding a threshold; and a first timing control unit and a second timing control unit each configured to respond to the phase difference in order to have one of the first and second processors stop generating either the first drive signal or the second drive signal.

3. A hazard display system according to claim 1, wherein the first processor and the second processor are configured to generate the first drive signal and the second drive signal, respectively, such that the period of the first drive signal equals the period of the second drive signal.

4. A hazard display system according to claim 1, wherein the first processor is configured to generate the first drive signal such that the period of the first drive signal is dependent on a data processing rate of the first processor.

5. A hazard display system according to claim 1, wherein the flicker synchronizing signal comprises a trigger pulse for triggering generation of the first drive signal.

6. A hazard display system for driving front and rear hazard lamps to flicker in response to a hazard signal and a flicker synchronizing signal transmitted in a multiplex control signal, comprising:

a flicker synchronizing signal generating section configured to generate said flicker synchronizing signal having a period including a drive start-on time and a drive start-off time, wherein said drive start-on time is a trigger period and said drive start-on time is shorter than said drive start-off time;

a hazard output signal generating section comprising, a first hazard output signal generating section configured to generate during said trigger period a front hazard output signal having a period including a drive-on time and a drive-off time, and a second hazard output signal generating section configured to generate during said trigger period a rear hazard output signal having a period including a drive-on time and a drive-off time; and a lamp driving section comprising, a first driving section configured to drive the front hazard lamps such that said front hazard lamps flicker in accordance with the front hazard output signal, and a second driving section configured to drive the rear hazard lamps such that said rear hazard lamps flicker in accordance with the rear hazard output signal, wherein said drive-on time and said drive-off time of said front hazard output signal and said rear hazard output signal are equal to each other, respectively, and an interval from a start of the drive within each trigger period to a start of the drive within the next trigger period are set equal to the period of said flicker synchronizing signal in order to flicker said front and rear hazard lamps in a predetermined period.

7. A hazard display system according to claim 6, further comprising:

a front and rear hazard signal decision-making section configured to make a decision as to whether a phase difference between said front hazard output signal and said rear hazard output signal has exceeded a predetermined time interval after the front hazard lamps and the rear hazard lamps have flickered a predetermined number of times in accordance with the number of repetitions of said front hazard output signal and said rear hazard output signal, respectively; and a timing control section configured to control the phase difference such that the phase difference exceeds the predetermined time interval in order to set the front hazard output signal and the rear hazard output signal to drive-off status until the front and rear hazard output signals enter drive-on status within a subsequent trigger period of the flicker synchronizing signal, respectively.

8. A hazard display system according to claim 6, wherein the hazard output signal generating section is cooperative with a central processing unit, and at least one of the drive start-on time and the drive start-off time of the flicker synchronizing signal is determined in dependence on a signal processing speed of the central processing unit.

* * * * *

UNITED STATES PATENT AND TRADEMARK OFFICE
CERTIFICATE OF CORRECTION

PATENT NO. : 6,055,465
DATED : April 25, 2000
INVENTOR(S) : Mototatsu MATSUNAGA

It is certified that error appears in the above-identified patent and that said Letters Patent is hereby corrected as shown below:

Column 1, line 51, change "de" to --be--.
Column 4, line 45, change "drivel-on" to --drive-on--.
          line 47, change "star" to --start--.
Column 5, line 61, change "embodiments" to --embodiment--.
Column 6, line 41, delete "through"
          line 42, delete "the".

Signed and Sealed this

Tenth Day of April, 2001

Attest:

NICHOLAS P. GODICI

Attesting Officer      Acting Director of the United States Patent and Trademark Office